United States Patent [19]

Takahashi et al.

[11] Patent Number: 4,811,487
[45] Date of Patent: Mar. 14, 1989

[54] MOTOR-DRIVEN CHAIN SAW BRAKING/LOCKING APPARATUS

[75] Inventors: Kazuyuki Takahashi; Yasuhiro Oe; Etushi Yamamoto, all of Hiroshima, Japan

[73] Assignee: Ryobi Ltd., Hiroshima, Japan

[21] Appl. No.: 681,051

[22] Filed: Dec. 13, 1984

[30] Foreign Application Priority Data

Dec. 14, 1983 [JP] Japan ................. 58-236999

[51] Int. Cl.$^4$ ............................................. B23B 57/02
[52] U.S. Cl. ....................................... 30/382; 188/166
[58] Field of Search ................. 30/382, 383, 384, 385; 188/77 R, 166

[56] References Cited

U.S. PATENT DOCUMENTS

| | | | |
|---|---|---|---|
| 3,991,469 | 11/1976 | Frederickson | 188/166 |
| 4,026,392 | 5/1977 | Hirschkoff | 188/77 R X |
| 4,246,701 | 1/1981 | Johansson | 30/382 |
| 4,302,879 | 12/1981 | Murray | 30/382 |
| 4,335,514 | 6/1982 | Overy et al. | 30/382 |
| 4,474,269 | 10/1984 | Kloberg et al. | 188/166 |
| 4,625,406 | 12/1986 | Fushiya et al. | 188/166 |

FOREIGN PATENT DOCUMENTS 48202 2/1982 PCT Int'l Appl. ................. 30/383

Primary Examiner—Donald R. Schrn
Assistant Examiner—Willmon Fridie, Jr.
Attorney, Agent, or Firm—Sughrue, Mion, Zinn, Macpeak & Seas

[57] ABSTRACT

An electric motor driven chain saw braking/locking apparatus with which electric current flow to the motor of the saw is halted simultaneously with braking of the motor when a hand guard is tilted forwardly. A belt brake device and a brake switching device are linked with the hand guard, which is pivotably mounted to the housing in front of a front handle, such that the braking force is applied at substantial of the same time that the switch is opened. A brake drum of the brake device is fixed to a motor drive shaft of the motor at a position where it receives cooling air from the motor. A lock mechanism is provided in the hand guard whereby, in an emergency, a braking operation with the hand guard can be easily and quickly performed.

9 Claims, 3 Drawing Sheets

MOTOR-DRIVEN CHAIN SAW BRAKING/LOCKING APPARATUS

BACKGROUND OF THE INVENTION

The present invention relates to an electric motor-driven chain saw braking/locking apparatus in which a cutting chain is wound around and supported by a forwardly projecting guide bar provided on a housing carrying an electric motor therein, the chain being driven by the electric motor.

A chain saw manufacturer is under an obligation to provide a braking apparatus for stopping the driving of a cutting chain to prevent phenomena such as the chain guide bar being violently kicked back upwardly due to suddenly increased cutting resistance of the cutting chain (the kickback phenomenon) or the operator's hand sliding off the front handle and coming into contact with the cutting chain.

Conventionally, a hand guard is used as a braking apparatus for such a chain saw. The conventional hand guard is arranged such that a braking belt wound around the outer periphery of a clutch drum is tensed by swinging the hand guard forwardly to thereby apply a braking force to an output shaft so as to stop the drive for the cutting chain. This arrangement is disadvantageous in that the transmission section from the hand guard to the braking mechanism is indirect and complicated so that, due to an accompanying long transmission time between members, there is a delay in braking. Moreover, the cutting chain cannot be stopped rapidly because the braking mechanism is arranged such that the motor is forcibly stopped in its energized state by the braking force.

SUMMARY OF THE INVENTION

The present invention is intended to eliminate the above-mentioned disadvantages of the prior art. The present invention provides an improved electric motor driven chain saw braking locking apparatus in which belt brake means and brake switching means are linked with a hand guard pivotally mounted in front of a front handle of the housing such that braking of the electric motor as well as interruption of electric circuit flow to the electric motor are performed at the same time upon forward movement of the hand guard. A brake drum of the belt brake means is fixed to a motor drive shaft at a position where it receives motor cooling air. A lock mechanism is provided in the hand guard whereby, in an emergency, a braking operation with the hand guard can be easily and quickly performed, the chain drive can be halted in an instant by the belt brake means and the brake switching means, and the braking operation of the belt brake is made sure by the cooling effect of the brake drum.

DESCRIPTION OF THE PREFERRED EMBODIMENTS

Figure 1:
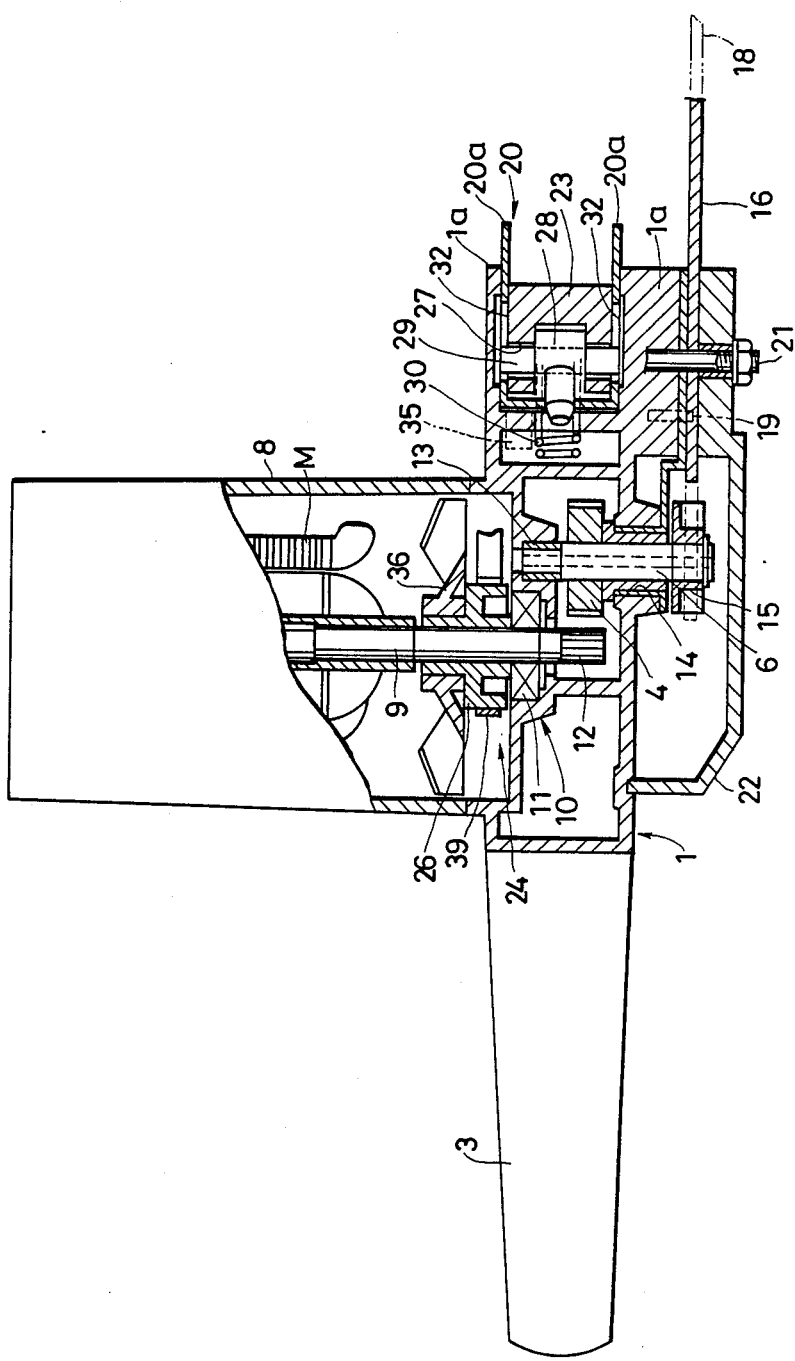
FIG. 1 is a longitudinally sectioned plan view showing an electric motor driven chain saw provided with a braking locking apparatus according to the present invention.
Figures 2, 3:
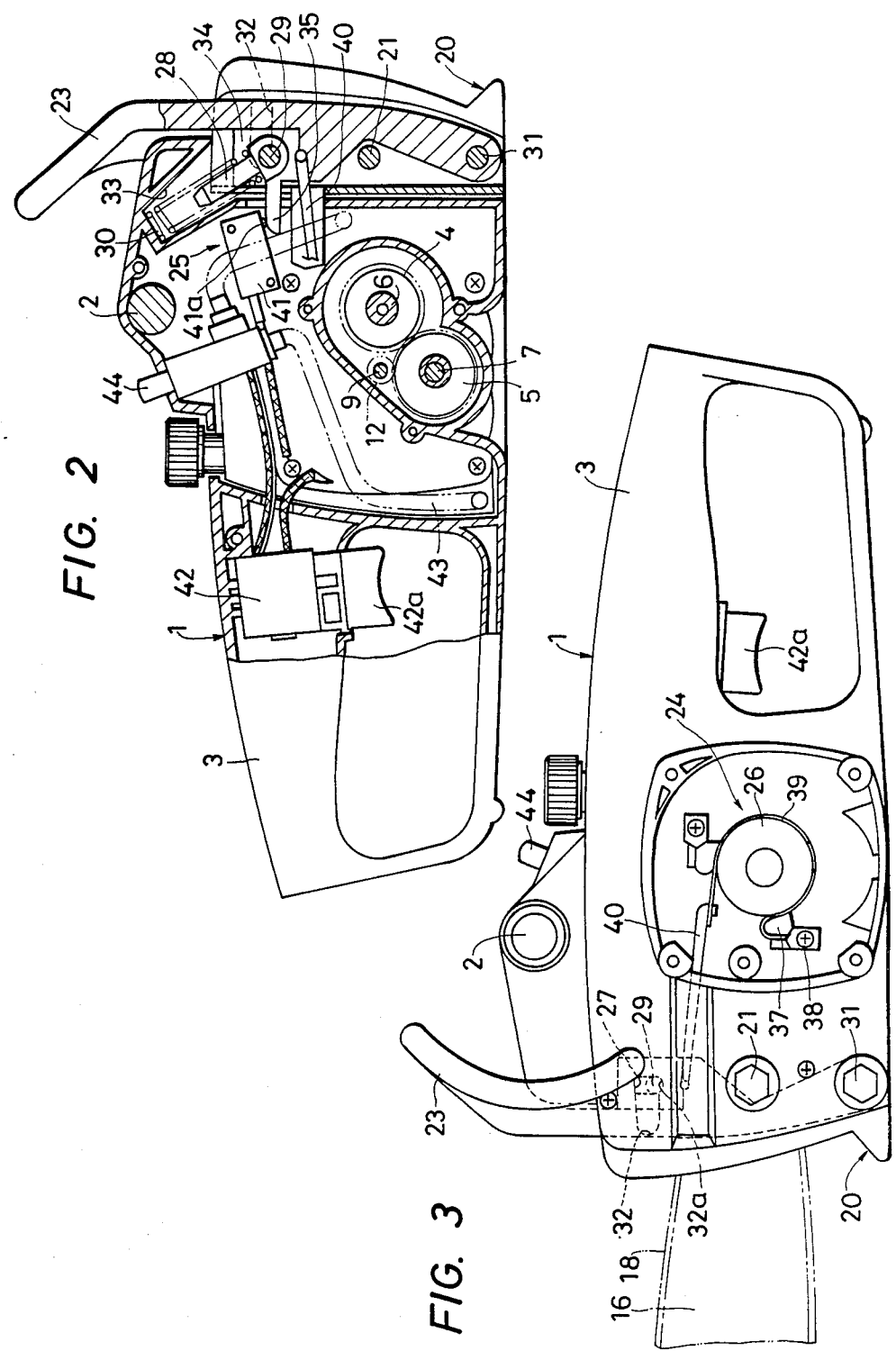
FIG. 2 is a longitudinally sectioned side view showing the same chain saw.
FIG. 3 is a side view showing the chain saw in a state in which the electric motor and the motor casing are removed.

The present invention will be described in detail hereinafter with reference to the accompanying drawings. As shown in FIGS. 1 and 2, an elongated and substantially flat housing 1 is provided with a front handle 2 and a rear handle 3. In the housing 1, a final gear 4 and an idler gear 5 are rotatably supported by a final shaft 7 in the condition that the gears 4 and 5 are meshed with each other. An electric motor M, mounted within a motor casing 8, is provided on one side of the housing 1. One end portion of a drive shaft 9 of the electric motor M is supported by a bearing portion 10 of the housing 1 through a bearing 11. A gear 12 at the forward end portion of the drive shaft 9 meshes with the idler gear 5.

The opposite end portions of the final shaft 6 are supported by the opposite (left and right) side walls 1a of the housing 1 through bearings 13 and 14, and one end of the final shaft 6 projects outwardly from the side wall 1a. A chain sprocket 15 is fixed to the projecting end of the final shaft 6.

Figure 4:
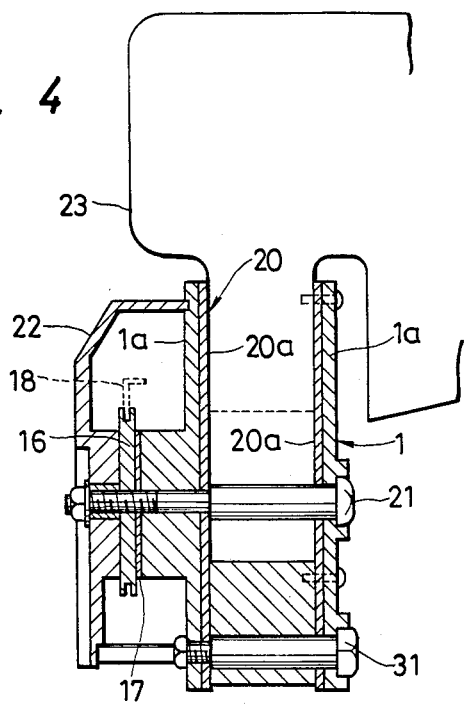
FIG. 4 is a partially tranversely sectioned front view showing the same chain saw.

A forwardly projecting guide bar 16 is fixed to the housing 1 through a guide bar receptacle 17. A cutting chain 18 is engaged and supported by the guide bar 16 and the sprocket 15 and is driven by the electric motor M. The guide bar receptacle 17 is secured together with a chain cover 22 to the housing 1, as shown in FIG. 4, by a bolt 21 passing through a spike assembly 20 provided at the front end of the housing 1 and having a forwardly opening substantially U-shaped cross section.

The braking/locking apparatus according to the present invention is arranged as follows.

As shown in FIGS. 1 to 5, a pivotably mounted hand guard 23, provided in front of the front handle 2 of the housing 1, slants rearwardly. The hand guard 23 is linked with a belt brake device 24 as well as a brake switching device 25 which operate so as to simultaneously brake and interrupt the flow of electric current to the electric motor M upon the hand guard 23 being pivoted forwardly. A brake drum 26 of the belt brake device 24 is fixedly mounted on the motor drive shaft 9 at a position where it can receive cooling air from the motor. A vertically oriented slightly elongated lock pin hole 27 is formed in the hand guard 23. A lock pin 29 passes through and is fixed to the front end portion of a lock pin holder 28 and is fitted in and engaged with the lock pin hole 27 in such a manner as to be slidable back and forth. The lock pin 29 is elastically urged forwardly and downwardly, as viewed in FIGS. 2 and 5, by a lock spring 30 provided on the lock pin holder 28. Accordingly, the hand guard 23 is also urged in the same direction.

The hand guard 23 is inserted in the spike assembly 20 and pivotally attached at its lower end portion to the spike assembly 20 and the opposite side walls 1a of the housing 1 by a bolt 31. Forwardly/backwardly extending elongated holes 32 are formed in the opposite side walls 20a of the spike assembly along the laws of the forward/backward movement of the lock pin 29. Engaging recesses 32a for the lock pin 29 are formed in the opposite side walls 20a continuous with the respective lower ends of the elongated holes 32. The opposite end portions of the lock pin 29 are slidably fitted into the elongated holes 32.

Figure 5:
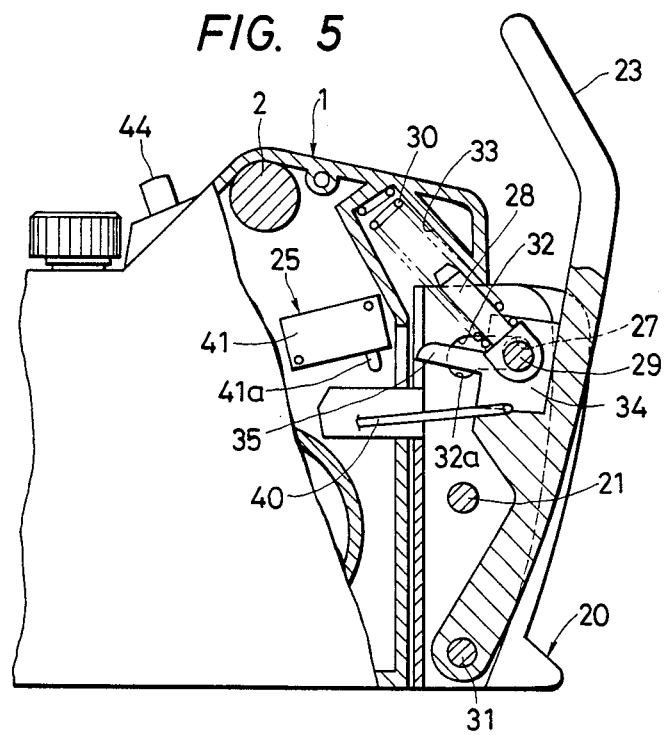
FIG. 5 is a partially longitudinally sectioned side view showing the chain saw in the state in which the hand guard is tilted forwardly.

When the hand guard 23 is swung rearwardly against the spring force of the lock spring 30, the lock pin 29 is guided by the elongated holes 32 to move to the position where it engages with the engaging recesses 32a. At this time, the spring force of the lock spring 30 acts as an engaging force for the lock pin 29 because the lock spring 30 urges the lock pin 29 forwardly and downwardly so that the hand guard 23 is locked and held in the retracted position as shown in FIG. 2, that is, in the state in which electric current is applied to the motor and the motor is not being braked. On the other hand, when the hand guard 23 is pushed slightly forwardly and the engagement between the lock pin 29 and the engaging recess 32a is released, the spring force of the lock spring 30 urges the hand guard 23 forwardly through the lock pin 29 to thereby maintain the state as shown in FIG. 5, that is, the state in which the electric motor M is braked and deenergized.

The lock pin holder 28 is provided at the upper front end portion of the housing 1 and disposed between a downwardly slanting recess 33 and a cut-away portion 34 formed at a substantially central recessed rear portion of the hand guard 23. The hand guard 23 is integrally provided with an operating lever 35 projecting rearwardly from one side of the cut-away portion 34 into the housing 1.

The belt brake device 24 is constituted by the brake drum 26 and a brake belt 39. The brake drum 26 is mounted on the drive shaft 9 and fixed in front of a fan 36 which generates cooling air for the motor. The brake belt 39, which has one end fixed to a projecting portion 37 of the housing 1 by a screw 38, is wound around the brake drum 26. The other end of the brake belt 39 is connected to the hand guard 23 through a connecting rod 40 so that the belt brake device 24 is interlocked with the hand guard 23.

The brake switching device 25 is constituted by a brake switch 41 fixedly provided in the housing 1, an electric circuit (not shown), and a push-type main switch 42. In the state shown in FIG. 2, when the hand guard 23 is retracted, an actuator 41a of the brake switch 41 is pushed by the operating lever 35 to turn on the brake switch 41. In this state, the motor electric circuit is closed and a trigger 42a of the main switch 42 is actuated so as to energize the electric motor M. If then the hand guard 23 is tilted forwardly, the actuator 41a is released from the operating lever 35 so that the motor electric circuit is deenergized without turning off the main switch 42.

In FIG. 2, reference numeral 43 designates an oil tank in the housing 1, and reference numeral 44 designates an oil pump. The oil pump 44 supplies lubricating oil from the oil tank 43 to the cutting chain 18 during normal cutting operations.

In the above-mentioned arrangement, in use, the hand guard 23 is pivoted rearwardly and the lock pin 29 is elastically engaged by and held in the engaging recess 32a in the elongated holes 32 so that, as shown in FIGS. 2 and 3, the hand guard 23 is held in the retracted position. In this state, when the main switch 42 is turned on, the electric motor M is started and the cutting chain 18 is driven by the sprocket 15 so that cutting can be commenced. In case kickback occurs, urging the operator's hand towards contact with the cutting chain 18, the operator's hand strikes the hand guard 23, pushing it forwardly. Engagement between the lock pin 29 and the engaging recess 32a is thereby released so that the hand guard 23 is slanted forwardly by the spring force through the lock pin 29. Thus, the belt brake device 24 is actuated and the electric motor M is braked, and at the same time the brake switching device 25 is actuated and the motor electric circuit shut off so that the electric motor M is deenergized and braked. The driving of the cutting chain 18 is thus quickly stopped. The main switch 42 remains in the on state.

If the hand guard 23 is pivoted rearwardly from the state in which the cutting chain 18 is stopped, the braking force is released by the return operation of the belt brake device 24. At the same time, the switch 41 of the brake switching device 25 is turned on by the operating lever 35 so that the motor electric circuit is closed and the motor M is energized again to thereby drive the cutting chain 18. At this time, it is not necessary to operate the main switch 42. The main switch 42 need be operated only when the electric motor M is to be energized or deenergized in the normal state where the hand guard is held in its retracted position.

With the electric motor driven chain saw braking-/locking apparatus according to the present invention arranged and operated in the manner described above, in case of an emergency in a cutting operation, not only is it possible to brake the motor M and at the same time deenergize the motor M so that the cutting chain can be stopped in an instant merely by urging the hand guard 23 forwardly, but also the brake switching device 25, including the manually operated main switch 42 and the brake switch 41 which is adapted to be turned on/off by the hand guard 23, provide a double-secure mechanism, thereby improving the safety of the saw. Further, since the electric motor M is deenergized and chain driving stopped by a small braking force, the belt brake device 24 can be reduced in size. Since the brake drum 26 is cooled by motor cooling air, the braking force is not reduced by heating so that the driving of the cutting chain 18 can be surely stopped. Further, since the hand guard 23 can be surely locked and held in either the non-braking position or the braking position, malfunctions are prevented from occurring. Thus the present invention has advantages that the cutting chain can be surely driven and stopped desiredly at any time.

We claim:

1. An electric motor driven chain saw braking/locking apparatus in which a cutting chain is wound around and supported by a guide bar projecting in a first direction from a housing having a front handle, said front handle being mounted on a front portion of said housing, said chain projecting from said front portion, said cutting chain being driven by an electric motor carried on said housing, comprising: a hand guard pivotally mounted on said housing between said cutting chain and said front handle with respect to said first direction; belt brake means and brake electrical switching means linked to said hand guard such that braking of said electric motor and cutting off of electric current flow to said electric motor are performed substantially simultaneously upon forward tilting of said hand guard, said belt brake means comprising a brake drum fixed to a drive shaft of said motor at a position receiving motor cooling air; a lock pin slidably engaged in an elongated hole formed in said front portion of said housing with said elongated hole extending in a second direction which is toward said hand guard and substantially parallel to said first direction, said elongated hole having a recess portion extending in a third direction which is transverse to said second direction; means for linking said lock pin with said hand guard such that when said locking pin is in a first position in said recess portion said forward tilting of said hand guard cannot occur; means, linked with said hand guard, for moving said lock pin out of said recess portion and to a second position in response to movement of said hand guard toward said chain; and a spring for basing said lock pin towards said hand guard and for urging said forward tilting of said hand guard in response to sliding movement of said lock pin in said second direction.

2. The chain saw braking/locking apparatus of claim 1, wherein said hand guard is pivotally mounted on a spike assembly of said housing.

3. The chain saw braking/locking apparatus of claim 1, wherein said elongated hole includes first and second hole portions formed in opposite sides of said housing.

4. The chain saw braking/locking apparatus of claim 1, wherein said spring urges said lock pin in a direction which makes an angle of less than 90° but greater than 0° with the forward direction whereby said spring will simultaneously urge said lock pin into said engaging recess portion of said elongated hole, and urge said lock pin in the forward direction.

5. The chain saw braking/locking apparatus of claim 1, wherein said spring urges said lock pin into said engaging recess portion of said elongated hole.

6. The chain saw braking/locking apparatus of claim 1, further comprising means for providing motor cooling air.

7. The saw braking/locking apparatus of claim 1, further comprising a fan for providing motor cooling air.

8. The chain saw braking/locking apparatus of claim 1, wherein a portion of said housing which forms said elongated hole in an area of said recess portion has an arcuate surface connecting said recess portion and the portion of said elongated hole which extends in said second direction, said lock pin being slidable along said arcuate surface when said lock pin moves between said first and second positions.

9. An electric motor driven chain saw braking/locking apparatus in which a cutting chain is wound around and supported by a guide bar projecting in a first direction from a housing having a front handle, said front handle being mounted on a front portion of said housing, said chain projecting from said front portion, said cutting chain being driven by an electric motor carried on said housing, comprising: a hand guard pivotally mounted on said housing between said cutting chain and said front handle with respect to said first direction; belt brake means and brake electrical switching means linked to said hand guard such that braking of said electric motor and cutting off of electric current flow to said electric motor are performed substantially simultaneously upon forward tilting of said hand guard, said belt brake means comprising a brake drum fixed to a drive shaft of said motor at a position receiving motor cooling air; a lock pin slidably engaged in an elongated hole formed in said front portion of said housing with said elongated hole extending in a second direction which is toward said hand guard and substantially parallel to said first direction, said elongated hole having a recess portion extending in a third direction which is transverse to said second direction; means for linking said lock pin with said hand guard such that when said locking pin is in a first position in said recess portion said forward tilting of said hand guard cannot occur; means, linked with said hand guard, for moving said lock pin out of said recess portion and to a second position in response to movement of said hand guard toward said chain; a spring for biasing said lock pin towards said hand guard and for urging said forward tilting of said hand guard in response to sliding movement of said lock pin in said second direction; and a lock pin holder extending substantially perpendicular to said lock pin, a forward end of said lock pin holder abutting said lock pin, and wherein said spring comprises a coil spring at least a portion of which is disposed around a portion of said lock pin holder.

* * * * *